United States Patent [19]

Richardson

[11] Patent Number: 4,532,408
[45] Date of Patent: Jul. 30, 1985

[54] APPARATUS AND METHOD FOR VIEWING MOLTEN POOLS IN ARC WELDING

[75] Inventor: Richard W. Richardson, Columbus, Ohio

[73] Assignee: The Ohio State University, Columbus, Ohio

[21] Appl. No.: 436,026

[22] Filed: Oct. 22, 1982

[51] Int. Cl.³ .............................................. B23K 9/10
[52] U.S. Cl. ........................... 219/130.01; 219/124.34; 219/130.21
[58] Field of Search ...................... 219/130.01, 130.21, 219/124.34, 136, 72, 147

[56] References Cited

U.S. PATENT DOCUMENTS

| | | | |
|---|---|---|---|
| 2,053,417 | 9/1936 | Brace | 219/72 |
| 2,945,943 | 7/1960 | Meyer | 219/147 |
| 3,212,695 | 10/1965 | MacGregor | 228/1 |
| 3,832,520 | 8/1974 | Glasser | 219/136 |
| 3,855,446 | 12/1974 | Kotova et al. | 219/125 PL |
| 4,093,844 | 6/1978 | Fellure et al. | 219/124.02 |
| 4,144,992 | 3/1979 | Omae et al. | 228/102 |
| 4,169,224 | 9/1979 | Puschner | 219/124.02 |
| 4,183,055 | 1/1980 | Burkhardt, Jr. et al. | 358/101 |
| 4,225,771 | 9/1980 | Justice et al. | 219/137 |
| 4,280,137 | 7/1981 | Ashida et al. | 358/101 |
| 4,305,096 | 12/1981 | Yokoshima et al. | 358/101 |
| 4,336,440 | 6/1982 | Cook et al. | 219/124.34 |
| 4,450,339 | 5/1984 | Corby, Jr. | 219/130.01 |

FOREIGN PATENT DOCUMENTS 339361  7/1972  U.S.S.R. .............................. 219/136

OTHER PUBLICATIONS

S. H. Rao, "Development of Weld Pool Imaging Techniques for the Adaptive Control of Gas Tungsten Arc Welding", A Thesis Submitted 9/1981 at The Ohio State University (pp. 1-5, 24-31).

Primary Examiner—Clifford C. Shaw
Attorney, Agent, or Firm—Sidney W. Millard

[57] ABSTRACT

An optical apparatus for use in viewing an arc welding process wherein the view is directly parallel to and around the electrode thus allowing the electrode tip to block the arc from direct view. The light seen is reflected from the mirror-like molten pool revealing the edge of the said pool which is a parameter directly analyzed by video picture analysis to control an arc welding process.

48 Claims, 3 Drawing Figures

APPARATUS AND METHOD FOR VIEWING MOLTEN POOLS IN ARC WELDING

BACKGROUND OF THE INVENTION

The invention relates to a novel method and apparatus for viewing the molten pool of metal in an arc welding process.

The process of arc welding is one of the most widely used manufacturing processes in the world. Efforts to automate the various aspects of the welding process have been especially great in recent years. The efforts have centered on attempting to automate the welding process to allow the use of robots which would be capable of producing very uniform, high quality welds. The reasons for seeking such automation are twofold: first, to increase productivity by increasing the speed and accuracy of the welding process in routine welding applications; and secondly, to increase the quality of the welds thus produced allowing automated welding to be utilized in high quality control industries such as the nuclear power industry.

In order to appropriately control the arc welding process and thereby allow for practical automation of the processes, numerous attempts have been made to objectively measure and discern precisely the pertinent parameters in the welding process. It has been said in the past that only the welding operator truly knows the quality of the weld and what is going on in the welding process. This is true because only he in the past has been able see precisely the quality and physical parameters of weld pool size and arc length. Also, only the operator can truly track the often irregular weld preparations or joints.

Attempts have been made to track welds by use of sensors which look ahead of the welding area. Such sensors attempt to discern where the weld preparation area or joint is and adjust the movement of the welding torch so as to coincide with the weld preparation or joint area. Such methods have utilized both direct contacting type sensors which are dragged through the weld preparation area ahead of the welding torch and by indirect measurement techniques, such as the use of infra-red detectors.

In recent years, use of television direct monitoring has increased. All of the methods of directly monitoring the arc welding area with a television camera have involved attempting to duplicate what the welding operator actually sees. Thus, the camera has been placed in such a position as to have an oblique view of the weld similar to the view enjoyed by the operator. Such an oblique view of the weld has the inherent problem of also viewing the arc that is very bright which tends to wash out the entire picture unless appropriate filters are utilized. Therefore, the methods of obliquely viewing the weld and arc area have also involved filtering the view by the camera to one or several discrete wave lengths of light, rather than viewing the broad spectrum of light that is available from the arc.

It has also been known for some time that there is a relationship between the actual width of the molten pool and the penetration being achieved by the welding process. Therefore, it has been thought to be desirable to be able to directly measure and also to control weld pool width. Precise control of the weld puddle width produces a correspondingly precise control of the penetration being achieved by the welding process.

Prior methods of analysis of video data being received from viewing the arc and weld pool area have made the assumption that the bright areas represent the weld pool and that once the light intensity has decreased to a certain value, then the edge of the weld pool has been approached. Such methods then employ a go/no-go type of binary logic system to establish the weld pool width. Unfortunately, there are oscillations to the weld pool caused by the fluctuation in voltage of the arc and also caused by the motion of the electrode forward along the weld preparation area. Such oscillatory motions cause the area of brightness to look considerably larger than it actually is. Attempts to mitigate the data error caused by the oscillatory motions have been precisely that—simply corrections of the data rather than actual measurement and evaluation of the true weld pool edge.

Thus, the problems of obliquely viewing the weld area with a television monitoring camera are that unforeseen obstructions of the camera in real welding situations can arise. Such obstructions can be caused by the weld preparation geometry and by constraints on the placement of the camera. Also, distortion of the image of the weld puddle is caused by the oblique viewing system. These are in addition to the over-exposure problems caused by direct arc viewing which are reviewed above.

It has been anticipated for some time that the best opportunity to provide reliable control to the welding process involves adequately and accurately measuring the process parameters at the point of welding. Welding parameters that can be measured directly at the point of welding seam tracking are voltage and current. The primary emphasis in this area has been tracking of weld seams or weld preparation areas. Unfortunately, in order to avoid damage to the sensor and also to keep the sensor from being obscured by the arc area and the melted metal, it has been necessary to sense the track some distance, even small, ahead of the weld torch. This immediately produces the requirement of having some delay in system response so that in fact the system responds to seam tracking changes at the time when the welding head is over the area of change.

Seam tracking devices have been of two types. First are those that use the arc itself as the sensor. Sensors of this type sense voltage and current variations in the arc when various surface features of the base metal are encountered. One such method oscillates the arc back and forth across the seam noting the voltage changes as the arc gets longer as it approaches the weld preparation. Various schemes have been proposed to allow for this oscillation. Both magnetic and mechanical motion devices have been utilized previously. The second method is the direct arc viewing method for seam tracking directly at the point of welding. Here the methods identify the edges of the weld preparation or weld groove from analysis of light from the arc reflected off the edges of the grooves or the side walls of the weld preparation area. A feedback system is then provided to respond to the reflected light to produce the desired effect of following the seam. Additionally, the problems of tracking the weld seam or weld preparation area by viewing the area ahead of the weld require that any information thus received be delayed before it is implemented so that the welding torch is indeed over the area detected, or the change detected, at the time the change instruction or signal is initiated. Also, any process control data whether it be used for weld seam tracking or for viewing welding parameters in the area of the arc and molten pool, are subject to error due to parallax from the oblique view of camera positions known in the prior art, and the undesirable masking of the far side of the weld pool by the arc itself.

SUMMARY OF THE INVENTION

The above noted problems are among those solved by reference to the present invention.

Therefore, a primary aspect of the present invention resides in the provision of a viewing system relying solely on reflected light. The light is reflected from the arc area off the mirror-like surface of the weld pool through an optical system into a television camera, or other camera type arrangement located at an image plane. The positioning of the optical system is such that the arc itself is not directly viewed, but is in fact shadowed by the end of the welding electrode. Another aspect of the present invention resides in the adaptation of the optical system for use with both fixed, non-consummable electrode welding processes, and consummable electrode welding processes, including automatic processes.

DETAILED DESCRIPTION OF THE INVENTION

Figure 1:
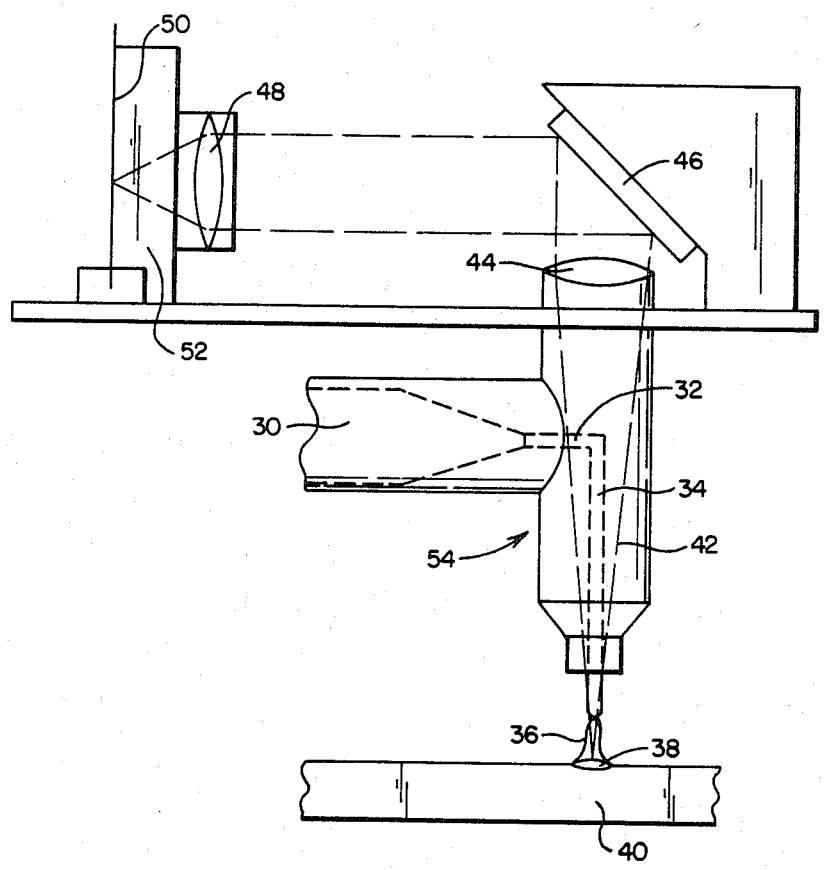
FIG. 1 is a schematic diagram of an optical viewing apparatus in accordance with the present invention.

FIG. 1 depicts a schematic diagram of the optical viewing apparatus in place on a GTAW (gas tungsten arc welding) process welding torch. The welding torch has been modified so that the non-consummable tungsten electrode 32 has been bent at right angles to the electrode holder 30, thereby producing an upper electrode region 32 and a lower electrode region 34. Electrode region 34 extends from the point at which the electrode is bent to the point of the arc 36 or the end of the electrode. Also shown in FIG. 1 is the molten or liquid weld pool 38 which is being viewed by the optical apparatus shown. The shielding gas retention tube 54 has also been modified to conform to the bent configuration of the electrode 32. The tube 54 has been cut, and the portion remaining around the electrode holder 30 abutted to an extended piece of tube disposed at the same angle as the bend in the electrode 32, thereby allowing the tube 54 to be along the axis of lower electrode region 34, surrounding the electrode 34 so that argon gas or other inert purge gas can be maintained at the weld area. The reasons for inert gas purging are well known in the art. The top of the tube 54 along the axis extension of the lower electrode region 34 is open to allow viewing of the weld pool 38 area and of the base metal 40. Immediately above the tube 54 is lens 44, a collimating lens to gather the reflected light into a parallel beam 42 for transmission to the balance of the optical system.

During the arc welding process, the high intensity light of the arc resides only below the tip of the electrode and is reflected off the weld pool. In the FIG. 1 configuration, the lens 44 and the optical viewing path 28 down the center of shielding gas nozzle tube extension 54 is such that the tip of the welding electrode 34 blocks or shadows the actual arc from view. The only light that is observable is the light reflected from the mirror-like surface of the weld pool. Light is also reflected from the surrounding base material which is not molten and also from the resolidified weld area immediately behind the adjacent to the travel of the weld torch, but the light reflected from base metal and resolidified weld metal is more diffuse than the bright reflection from the mirror-like surface of the weld puddle. This light beam 42 is directed upwards and is received by lens 44 and in the FIG. 1 embodiment is reflected from mirror 46 which is disposed at 45° to the direction of the welding electrode axis 34, but clearly reflectable at any usable angle. The light beam 42 is then directed to lens 48 for focusing at an image plane 50. In the embodiment shown in FIG. 1, lens 48 is a telephoto lens that has been focused at infinity and the image plane occupies the light sensitive array of a solid state television camera. The image plane can also occupy the light sensitive surface of a camera or can be directly viewed by eye with the use of a safety glass of some sort to protect from ultraviolet light that is also reflected up the light beam 42.

Therefore, the arrangement consists of a modified GTAW torch with a tungsten electrode bent at right angles. Light from the arc is reflected off the weld pool surface, through the shielding gas nozzle 54 and collimated by the lens 44 at the focal point of which coincides with the pool location. The collimated light is reflected by the mirror 46 and is brought to a focus in the image plane 50 by the focusing lens 48. This optical arrangement renders the image sharp and insensitive to actual camera placement along the optical path since the light beam 42 has been collimated. If only a single lens is utilized, the light is not columnated and precise location of the image plane 50, or camera 52, is important in order to avoid magnification or reduction of the image of the weld pool. Avoidance of such image distortion is most important since one of the uses made of this direct and undistorted view of the weld pool is the measurement of the weld puddle width.

However, when a consummable electrode is utilized as in the GMAW (gas metal arc welding) process, it is not practical to locate a lens directly in the path of the advancing consummable electrode.

Figure 2:
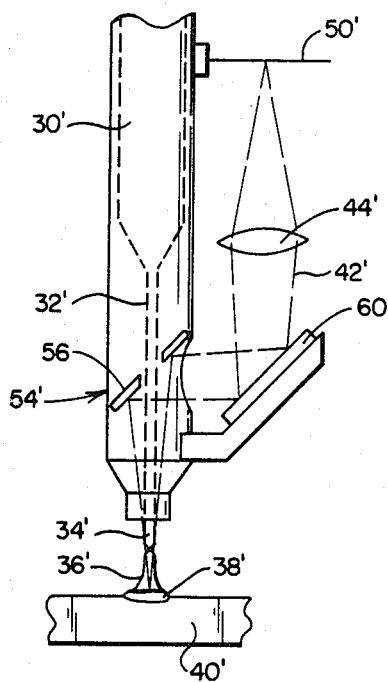
FIG. 2 is schematic diagram of a second viewing apparatus according to the present invention.

Turning now to FIG. 2, which shows a schematic diagram of an alternative embodiment of the present invention as employed in a non-consummable electrode process, as for example GTAW, the the shielding gas tube 54' has been modified by inserting a mirror with a hole drilled in it about the non-consummable electrode and the opening of an optical window in the side of the tube 54'. During the welding process, light from the arc 36' is again obscured by the tip of the electrode 32'. The light from the arc 36' is reflected off the weld pool 38' and the base material 40' as previously described. This reflected light beam 42' is reflected upwards to mirror 56 which is disposed about the electrode. The light beam 42' is then reflected to a second mirror located at a coordinate angle to the first angle, to redirect light beam 42' in a direction parallel to the electrode holder 30'. The beam 42' is then directed through a lens 44' to an image plane 50'. It will be noted in this configuration that only one lens has been utilized. Therefore, the light has not been collimated before reaching by lens 44' and the precise location of image plane 50' is of vital importance as described above. In the embodiment shown in FIG. 2, the image plane 50' is actually intended to be occupied by a television camera or other camera or viewing device mounted directly on the welding torch. By placing the camera directly on the welding torch, the camera must follow all movements of the torch.

Figure 3:
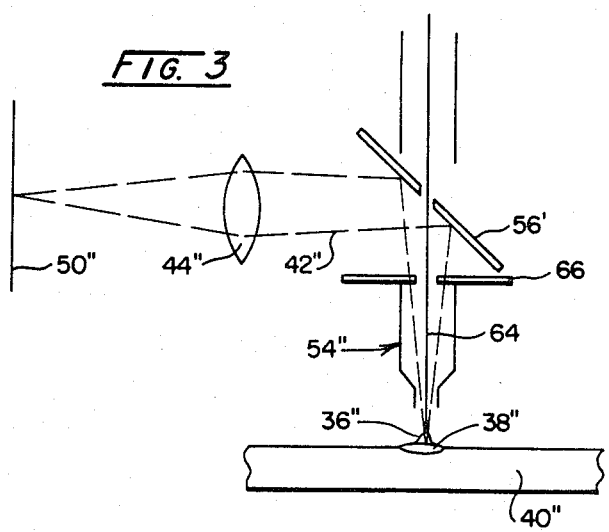
FIG. 3 is schematic diagram of a third viewing apparatus according to the present invention.

Turning now to FIG. 3, which shows schematically another embodiment of the invention for use with a consummable electrode process, as for example the GMAW process, the mirror 56' has been modified by having a hole drilled therein to allow for passage of the consummable electrode filler metal wire 64. Also, since this is an inert gas welding process, there is a gas tube 54" that is topped by a piece of plexiglass 66 with an hole drilled therethrogh also to allow for passage of the filler metal wire 64. The purpose of the plexiglass cover with the small hole is to prevent the inert gas purge from leaking out the top and also to provide a transparent window for the beam of light 42" which is reflected light originating at the arc 36" and reflected from the weld pool 38" and from the base metal 40" as described above. This, as in FIG. 2, is a single lens arrangement and therefore, the light is not collimated and the position of image plane 50" relative to lens 44" and the relationship between lens 44" and the mirror 56' and the distance from the mirror 56' to the weld pool 38" are strictly regulated distances. The distance from the weld pool 38" to the mirror 56' and hence to the lens 44" is equal to the focal length of the lens 44". Again, this is not the most advantageous relationship, but is necessary because the choice was made not to drill a hole through an operating lens. However, it will be appreciated that a hole could be drilled through the lens 44 or 44', or 44", thus avoiding the use of the mirrors to avoid the path of the weld filler metal 64 or of the fixed non-consummable tungsten electrode 34, and that the use of additional mirrors to avoid this lens drilling is simply a matter of choice. The precise location once achieved of the image plane, the lens and the other optics of this system will elminate or minimize any magnification problems. This can be set up in initial testing and thereafter does not need to be changed.

Additional advantages of directly viewing the weld pool from above and in line with the welding electrode, in addition to that of blocking of the arc by the electrode are that the entire weld pool may be viewed without blockage by the arc itself or by any retaining apparatus of the electrode. Any support structures for the electrode which are located near the molten weld pool are simply out of focus and do not block the view of the weld pool. Additionally, the viewing lenses in the optical systems are protected by the shield gas nozzle and by the purging gas itself from damage by the arc and any weld spattering that may be going on. Additionally, the viewing system does not intrude into the vital space immediately around the torch head and thus does limit access into tight areas.

It will be appreciated that the optical system can be easily integrated into a torch utilizing optical fiber methods to transmit the image to a remote viewing location. Additionally, the optical system can be easily utilized on welding process that has no inert gas purge or gas retaining tube, the light beam path being simply around the electrode.

This invention may be embodied in other specific forms without departing from the spirit and essential characteristics thereof. The present embodiments are therefore considered in all respects as illustrative and not restrictive, the scope of the invention being indicated by the appended claims rather than the foregoing description and drawings and all changes which come within the meaning and range of the equivalency of the claims are therefore intended to be embraced therein.

I claim:

1. An optical apparatus for use in viewing an arc welding process the apparatus comprising:
   (a) a welding torch with an electrode mounted therein, the electrode having a tip from which an arc is drawn during welding at a region of a base metal, the electrode having a linear portion extending from the tip; and
   (b) an optical system including a lens and having an optical path for conveying a bundle of light rays reflected from the weld region of the base metal around the electrode tip to said lens for focusing the light to form a machine readable image, wherein the axis of the bundle of light rays at the initial portion of said optical path extends from the weld region parallel to said linear portion of the electrode, said bundle of light rays substantially surrounding said linear tip end.

2. An optical apparatus according to claim 1 wherein said electrode comprises two regions, an upper region extending from an electrode holder to a point of intersection with a lower region, and a lower region which is not collinear with said upper region and which extends from said point of intersection to said tip of said electrode; and said optical path is disposed about the axis of said lower region.

3. An optical apparatus according to claim 2 wherein said upper and lower electrode regions intersect at a first angle, said first angle being in the range of 45° to 135°.

4. An optical apparatus according to claim 1 further comprising at least one mirror, said mirror intersecting said optical path.

5. An optical apparatus according to claim 4 wherein the line normal to the surface of said mirror is an angle of about 45° to said optical path.

6. An optical apparatus according to claim 5 further comprising a lens arranged to receive light passing along said optical path and reflected from said mirror, said lens focusing said light to form an image of an area adjacent said tip of said electrode.

7. An optical apparatus according to claim 6 further comprising a screen arranged to receive said image.

8. An optical apparatus according to claim 6 further comprising a camera arranged to receive said image.

9. An optical apparatus according to claim 6 further comprising a video camera arranged to receive said image.

10. An optical apparatus according to claim 1 further comprising a collimating lens disposed in said optical path and arranged to collimate light passing along said optical path from an area adjacent said tip into a parallel beam, and a focusing lens arranged to receive said parallel beam of light from said collimating lens and to bring said parallel beam of light to a focus, thereby forming an image of said area.

11. An optical apparatus according to claim 10 further comprising a mirror arranged to receive said parallel beam of light from said collimating lens and to deflect said parallel beam so that said parallel beam passes through said focusing lens.

12. An optical apparatus for use in viewing a shielded gas arc welding process, said apparatus comprising: a welding electrode having a tip from which an arc can be drawn during welding to form a weld pool on a weld joint preparation disposed adjacent said tip, the electrode having a linear portion extending from the tip, and a tube having walls defining a window therein, said tube being disposed around said electrode and surrounding said linear portion of said electrode the internal surface of said tube and the external surface of said electrode defining a light path extending from adjacent said tip of said electrode parallel to said linear portion of the electrode to said window, thereby permitting light originating at said arc and reflected from the surface of said weld pool and from the surrounding areas of said weld joint preparation to pass along said light path and leave said tube via said window.

13. An optical apparatus according to claim 12 further comprising a focusing lens arranged to receive light passing along said light path and to focus said light, thereby producing an image of said weld pool.

14. An optical apparatus according to claim 13 further comprising a collimating lens arranged to receive said light passing along said light path from said weld pool and to form said light into a parallel beam, said focusing lens receiving said parallel beam from said collimating lens and focusing said parallel beam to produce said image.

15. An optical apparatus according to claim 12 wherein said window is an aperture defined by said walls of said tube.

16. An optical apparatus according to claim 15 wherein a mirror is disposed within said tube and arranged to reflect light passing along said light path through said aperture.

17. An optical apparatus according to claim 16 wherein a second mirror is disposed outside said tube, said second mirror being arranged to receive said light which has been reflected from said mirror within said tube and passed through said aperture, said second mirror reflecting said light in a direction substantially parallel to the direction in which said light travels from said weld pool to said mirror within said tube.

18. An optical apparatus according to claim 17 further comprising a focusing lens arranged to receive said light reflected from said second mirror and to form an image of said weld pool.

19. An optical apparatus according to claim 17 further comprising a screen arranged to receive said image.

20. An optical apparatus according to claim 17 further comprising a camera arranged to receive said image.

21. An optical apparatus according to claim 17 further comprising a video camera arranged to receive said image.

22. An optical apparatus according to claim 12 wherein said window comprises a transparent section in said walls of said tube.

23. An optical apparatus according to claim 22 wherein said transparent section is at the opposed end of said tube from said tip of said electrode so that said light path is linear and extends the whole length of said tube.

24. An optical apparatus according to claim 23 wherein said electrode is non-linear and does not pass through said transparent section.

25. An optical apparatus according to claim 24 wherein a side tube is mounted on one side of said tube and wherein said electrode has two sections, a first section extending from within said side tube into said tube, and a second section extending from the end of said first section within said tube to said tip, said internal surface of said tube and the external surface of said second section of said electrode defining at least part of said light path.

26. An optical apparatus according to claim 23 wherein said transparent section defines an aperture therethrough and said electrode passes through said aperture, said optical apparatus further comprising a mirror disposed to receive light emerging from said tube via said transparent section and to deflect said light away from said electrode.

27. An optical apparatus according to claim 26 wherein said mirror defines an aperture therethrough and said electrode passes through said aperture in said mirror.

28. An optical apparatus according to claim 26 further comprising a focusing lens arranged to receive said light reflected from said mirror and to focus said light, thereby producing an image of said weld pool.

29. An optical apparatus according to claim 28 further comprising a screen arranged to receive said image.

30. An optical apparatus according to claim 28 further comprising a camera arranged to receive said image.

31. An optical apparatus according to claim 28 further comprising a video camera arranged to receive said image.

32. An optical apparatus according to claim 22 wherein said transparent section comprises a lens.

33. An optical apparatus according to claim 32 wherein said lens is a collimating lens arranged to collimate said light reflected from said weld pool into a parallel beam, said optical apparatus further comprising a focusing lens arranged to receive said parallel beam of light from said collimating lens and to focus said parallel beam thereby forming an image of said weld pool.

34. An optical apparatus according to claim 33 further comprising a screen arranged to receive said image.

35. An optical apparatus according to claim 33 further comprising a camera arranged to receive said image.

36. An optical apparatus according to claim 33 further comprising a video camera arranged to receive said image.

37. An optical apparatus according to claim 33 further comprising a mirror arranged to receive said parallel beam from said collimating lens and to deflect said parallel beam so that said parallel beam passes through said focusing lens.

38. An optical apparatus for use in viewing an arc welding process of the type wherein an electrical arc is established between the tip of a welding electrode and a base metal, the electrode having a linear portion extending from the tip, and wherein a molten pool of metal is formed where the arc enters the base metal that is being welded, the apparatus comprising:
  (a) a welding torch with the electrode mounted therein; and
  (b) optical means for conveying a bundle of light rays which travel along an optical path from the molten pool to a lens for forming an image, the bundle of light rays having an axis extending from the molten pool parallel to the linear portion of the electrode and substantially surrounding said linear portion.

39. An optical apparatus according to claim 38 wherein said electrode is bent, and said beam of light departs from said electrode at the region at which said electrode is bent.

40. An optical apparatus according to claim 38 further comprising a mirror and a lens, said mirror reflecting said beam of light onto said lens, and said lens focusing said beam to produce an image of said pool.

41. An optical apparatus according to claim 40 further comprising a screen arranged to receive said image.

42. An optical apparatus according to claim 40 further comprising a camera arranged to receive said image.

43. An optical apparatus according to claim 40 further comprising a video camera arranged to receive said image.

44. An optical apparatus according to claim 38 further comprising a lens, said lens being arranged to receive and focus said beam to produce an image of said pool.

45. An optical apparatus according to claim 44 further comprising a camera arranged to receive said image.

46. An optical apparatus according to claim 44 further comprising a screen arranged to receive said image.

47. An optical apparatus according to claim 44 further comprising a video camera arranged to receive said image.

48. A method of forming a machine readable image of an arc welding process of the type in which an electrical arc is provided between the tip of a welding electrode having a linear tip end and a base metal to thereby form a pool of liquid metal on said base metal and focusing light from the weld pool to form an image wherein the improvement comprises: focusing the bundle of light rays which leave the pool with an optical path having its axis parallel to the linear tip end of the welding electrode of said process, said bundle of light rays substantially surrounding said linear tip end, thereby allowing said arc to be obscured from the focusing means by said tip end.

* * * * *

UNITED STATES PATENT AND TRADEMARK OFFICE
CERTIFICATE OF CORRECTION

PATENT NO.  : 4,532,408
DATED       : July 30, 1985
INVENTOR(S) : Richard W. Richardson It is certified that error appears in the above-identified patent and that said Letters Patent is hereby corrected as shown below:

On the title page of the application between the title and the Background of the Invention the following sentence should be inserted:

--This invention was made with Government support under Grant No. ISI-8018104 awarded by the National Science Foundation. The Government has certain rights in this invention--.

Signed and Sealed this

Seventh Day of January 1986

[SEAL]

Attest:

DONALD J. QUIGG

Attesting Officer

Commissioner of Patents and Trademarks